United States Patent [19]
Francini et al.

[11] Patent Number: 4,701,601
[45] Date of Patent: Oct. 20, 1987

[54] TRANSACTION CARD WITH MAGNETIC STRIPE EMULATOR

[75] Inventors: Joseph P. Francini, Castro Valley; Einar L. Asbo, Mill Valley; Vincent Boston, San Mateo, all of Calif.

[73] Assignee: Visa International Service Association, San Mateo, Calif.

[21] Appl. No.: 727,869

[22] Filed: Apr. 26, 1985

[51] Int. Cl.⁴ .............................................. G06K 7/08
[52] U.S. Cl. .................................. 235/449; 235/380; 235/492; 235/493
[58] Field of Search ................. 235/449, 493, 492, 380

[56] References Cited

U.S. PATENT DOCUMENTS

| | | |
|---|---|---|
| 3,938,090 | 2/1976 | Borison et al. |
| 4,007,355 | 2/1977 | Moreno .......................... 235/492 X |
| 4,498,000 | 2/1985 | Decavele et al. .................... 235/380 |
| 4,507,550 | 3/1985 | Fleer .................... 235/449 |
| 4,575,621 | 3/1986 | Dreifus .......................... 235/492 X |
| 4,605,844 | 8/1986 | Haggan .......................... 235/492 X |
| 4,614,861 | 9/1986 | Pavlov et al. ........................ 235/380 |
| 4,650,981 | 3/1987 | Foletta .................... 235/449 |

*Primary Examiner*—David L. Trafton
*Attorney, Agent, or Firm*—Limbach, Limbach & Sutton

[57] ABSTRACT

A transaction card is disclosed having a magnetic stripe emulator. The transaction card is adapted for use with presently available transaction terminals that include a sensor for reading a magnetic stripe. The subject card includes a transducer for generating a varying magnetic field corresponding to information typically encoded on a magnetic stripe. In operation, a microprocessor in the card extracts transaction data stored in a memory and supplies output signals to the transducer. The transducer generates a varying magnetic field corresponding to the transaction information which is read by the sensor in the transaction terminal.

11 Claims, 2 Drawing Figures

TRANSACTION CARD WITH MAGNETIC STRIPE EMULATOR

DESCRIPTION

1. Technical Field

The subject invention relates to a transaction card having a magnetic stripe emulator. The transaction card is adapted for use with presently available transaction terminals that include sensors for reading a magnetic stripe. The subject card includes a transducer for generating a varying magnetic field corresponding to information typically encoded on a magnetic stripe. By this arrangement, a transaction card, which does not include a magnetic stripe, can interface with present day transaction terminals.

2. Background of the Invention

At the present time, bank or transaction type cards have gained wide acceptance throughout the world. Various transaction cards are used as an alternative to cash. In addition, transaction cards have been used to initiate and carry out 24-hour banking services and other automatic purchases.

The vast majority of transaction cards in present use consist of a rectangular plastic carrier having account information embossed thereon. In addition, the carrier typically includes a magnetic stripe encoded with account information. The account information encoded on the magnetic stripe can include an account number, transaction identification number and even secret identifying code information. In some systems, the data on the card is encrypted to make counterfeiting more difficult.

Because of increasing credit and fraud losses, various systems have been instituted to detect lost or stolen cards and to provide some form of authorization system for approving transactions. One of the simplest forms of security is to periodically print and distribute lists of lost or stolen cards. When a card is presented for a transaction, the card number is checked against this list prior to approval of the transaction by the merchant. Unfortunately, this approach is time-consuming and prone to error. More importantly, because the information is distributed periodically, this system will not detect the fraudulent use of a card, prior to the time it has been reported lost or stolen and thereafter listed in the bulletin.

Recently, there have been developed various automatic "on-line" verification systems. In these systems, the card information is transmitted via a communication link to a central data storage area for approval. This information can be input into the system through a transaction terminal located at the point of transaction.

In order to facilitate the entry of data in the electronic systems, account information is frequently encoded onto a magnetic stripe on the back of the card. The transaction terminal is provided with a magnetic reader which accesses the information on the card. In use, the merchant swipes the card through the reader permitting the sensor in the transaction terminal to read the information. The data on the magnetic stripe is then analyzed during the approval process. Additional information is often encoded on the card to further enhance security. Such enhancements can include the use of personal identification numbers or PINs.

Despite these safeguards, credit and fraud losses are still quite high. One avenue of fraud includes the manufacture of counterfeit cards. Equipment has been developed to facilitate the counterfeiting of the magnetic stripe. In one scenario, blank cards are manufactured having nonencoded magnetic stripes. The card is placed in a separate device, called a skimmer, which includes a read and write head. A valid, illegally obtained card is also placed in the skimmer. The skimmer functions to copy the information encoded on the magnetic stripe of the valid card and encode that information onto the magnetic stripe of the counterfeit card. This type of counterfeiting accounts for a significant portion of the fraud losses experienced by the industry. Accordingly, it would be desirable to provide a system for reducing such fraud losses.

Recently, there has been developed a new type of transaction card which is intended to facilitate high speed processing and reduce credit and fraud losses. This new generation of transaction cards have been generically referred to as "smart cards" since they typically possess a microprocessor and storage elements for handling various parts of a transaction. The use of smart cards has gained a significant degree of acceptance in the European community. A number of patents have issued covering various smart card devices, including U.S. Pat. No. 4,211,919, issued July 8, 1980 to Ugon; U.S. Pat. No. 4,295,041, issued Oct. 13, 1981 to Ugon; U.S. Pat. No. 4,256,955, issued Mar. 17, 1981 to Giraud; and U.S. Pat. No. 4,443,049, issued Apr. 17, 1984 to De Pommery. All the latter patents are assigned to a common assignee in France.

A number of other patents have issued covering various aspects of the smart card technology. The following patents are all related in one way or anothr to these developments. These patents are as follows: U.S. Pat. No. 3,971,919 to Moreno; U.S. Pat. No. 4,001,550 to Schatz; U.S. Pat. No. 4,102,493 to Moreno; U.S. Pat. No. 4,222,516 to Badet; U.S. Pat. No. 4,417,413 to Hoppe; U.S. Pat. No. 4,443,027 to McNeely; and U.S. Pat. No. 4,447,716 to Aigo.

Typically, smart card systems are designed from the ground up. For example, new transaction terminals are developed which would be compatible with the newly designed smart cards. In operation, transaction information is transferred between the smart card and the transaction terminal through an electromechanical interface.

The smart cards have many advantages over the more common plastic cards found in the prior art. For example, smart cards can be provided with the ability to store an account balance which can be successively debited during transactions. The storage system in these cards can also be provided with data representative of a secret code of the user. In operation, the authorized user will enter a secret code or a personal identification number (PIN) which is then compared with the data stored in the card. This approach provides extra security since it is almost impossible for an unauthorized user to gain access to the secret code. The card will only be actuated if the PIN, entered by the user, matches the secret code stored in the card. Such an approach is disclosed in U.S. Pat. No. 4,102,493 to Moreno, cited above and incorporated herein by reference.

The advantages of the smart cards have been recognized and efforts are being made for their introduction into domestic and other foreign markets. As can be appreciated, however, a large network of transaction terminals exist which were designed to interface with the presently available cards that have information encoded on a magnetic stripe. It is estimated that in the United States alone there are over 480 million cards having magnetic stripe information and over 130 thousand terminals adapted to interface with these cards. As can be appreciated, as the new smart cards are introduced, it will take a significant amount of time to replace the present transaction terminals with transaction terminals capable of interfacing with the electronic contacts of the smart card.

Accordingly, it is an object of the subject invention to provide a new and improved transaction card which is adapted for use with present transaction terminals.

It is another object of the subject invention to provide a new and improved transaction card having a magnetic stripe emulator which can interface with the sensor of existing transaction terminals.

It is a further object of the subject invention to provide a new and improved transaction card having a transducer for generating a varying magnetic field that can be sensed by the reader in a transaction terminal.

SUMMARY OF THE INVENTION

In accordance with these and many other objects, the subject invention relates to a transaction card having the advantages of the so-called smart cards yet can interface with present transaction terminals having a sensor for reading information magnetically encoded on a card. More specifically, a transaction card is provided having a magnetic stripe emulator. The card is defined by a carrier which is receiveable in the existing transaction terminals. A processor means is provided within the carrier for generating electrical output signals. A storage means is also provided within the carrier and is connected to the processor means. The storage means functions to hold data representative of various transaction information.

In accordance with the subject invention, a transducer means is provided within the carrier and is connected to the processor means. The transducer means, such as a thin film head, generates a varying magnetic field that extends beyond the surface of the carrier.

In operation, the processor means functions to extract transaction information from the storage means and generate and supply output signals to the transducer means. The transducer means generates a varying magnetic field in response to the output signals it receives from the processor means. These varying magnetic fields are readable by the sensor means in the transaction terminal.

In the preferred embodiment, the carrier is also provided with a key pad to activate the emulation function. Preferably, a secret code is held in the storage means which can be compared with data entered through the key pad by the user. If the data entered by the user matches the data in the storage means, the emulation function will be activated.

The storage means is preferably supplied with the type of information generally encoded on the magnetic stripe of existing cards. One advantage of the subject invention is that the storage means may be provided with information regarding a number of cards typically carried by a consumer. Depending upon the entries into the key pad, individual outputs could be selected such that a single card can be used to emulate a number of different transaction cards.

Further objects and advantages of the subject invention will become apparent from the following detailed description taken in conjunction with the drawings in which:

DETAILED DESCRIPTION OF THE PREFERRED EMBODIMENT

Figure 1:
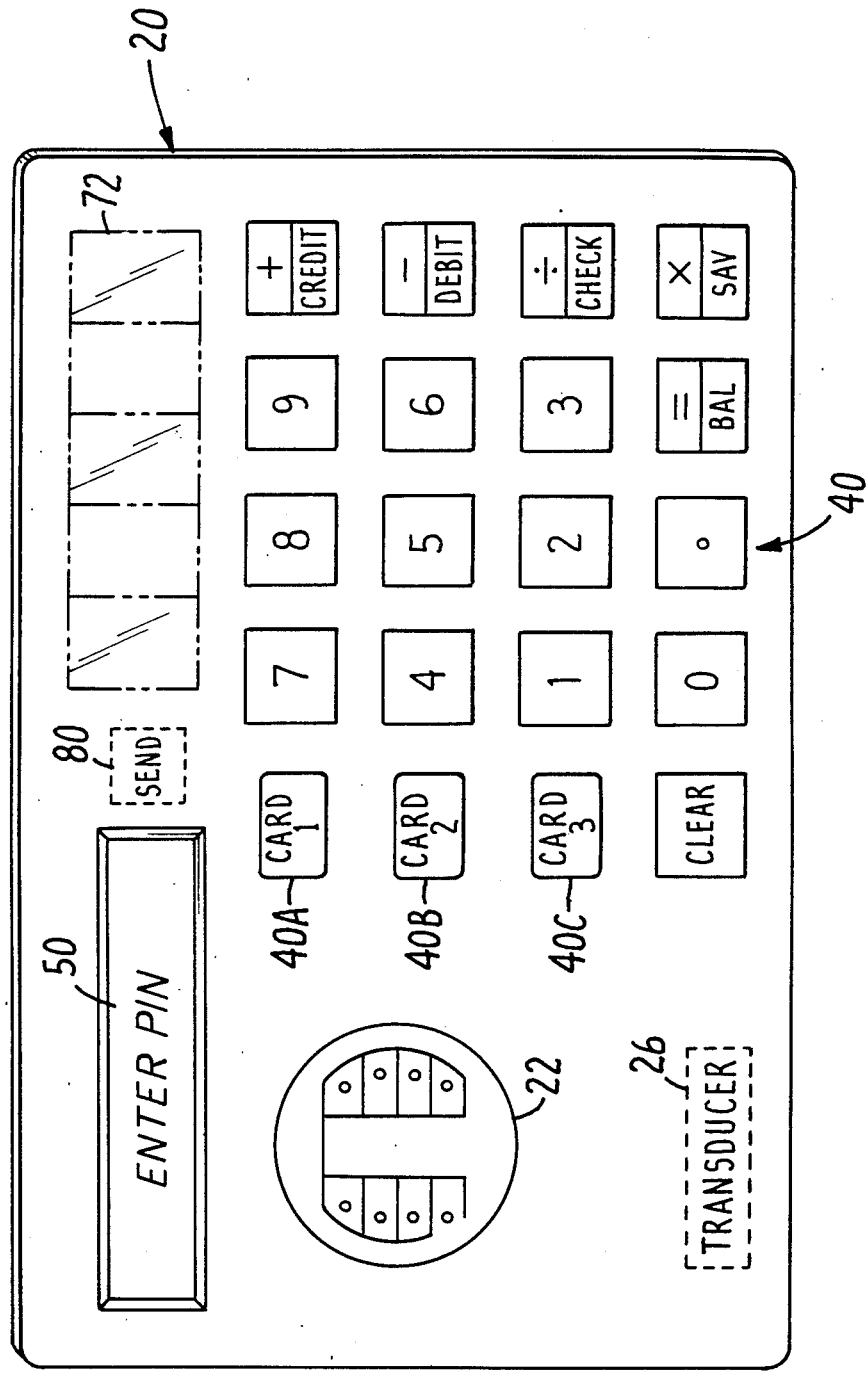
FIG. 1 is a planar view of one surface of the card of the subject invention.

Referring to FIG. 1, there is illustrated the card 20 of the subject invention. Preferably, card 20 is formed from a laminar plastic, having dimensions as specified in the ISO Document ISO/TC97/SC17/WG4-N95.

Figure 2:
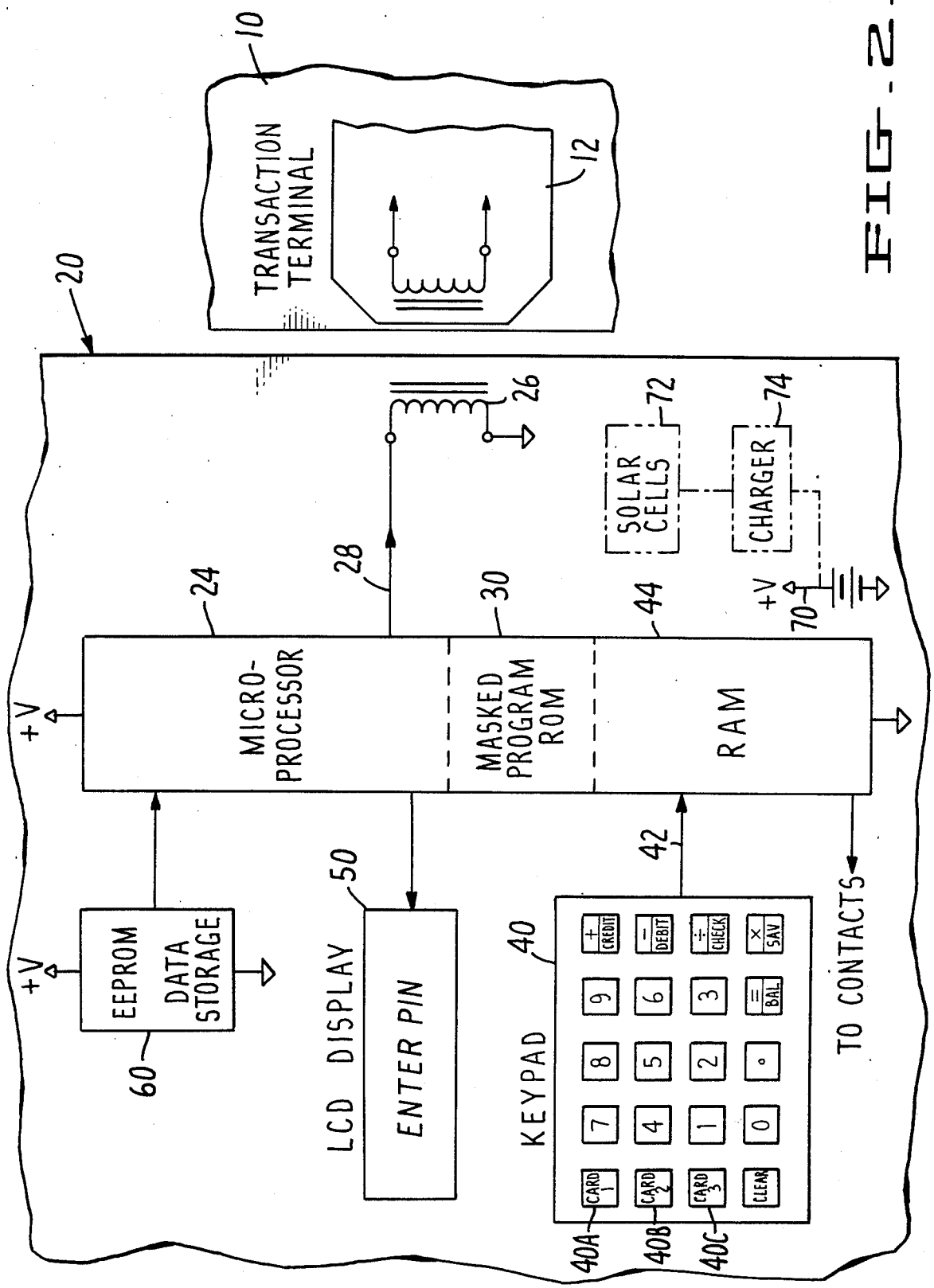
FIG. 2 is a schematic diagram illustrating the components of the subject invention and the interface with the transaction terminal.

In accordance with the subject invention, card 20 includes a microprocessor 24, as illustrated in block form in FIG. 2. The inclusion of the microprocessor provides the card with a vast array of capabilities discussed above. At the present time, extensive literature concerning the development and manufacture of smart cards is available to one skilled in the art, such that the disclosure of the subject invention will be limited to the novel features contained therein. Among the literature available are the patents to Hoppe and Aigo, cited above, wherein significant details are given concerning the mounting of an integrated circuit microprocessor within the body of a carrier. The subject invention is intended to be applicable for use with any of new types of cards.

As discussed in the latter patents and the others cited above, the prior art smart cards will typically include an electrical interface for connection with electronic transaction terminals. The subject card 20 is also provided with a similar interface, shown at 22 in FIG. 1, so it can communicate with the appropriate terminals. At this point in time, uniform standards for this type of interface have not yet been developed. However a variey of approaches have been utilized. One suitable design can be found in U.S. Pat. No. 4,222,516, to Badet.

Interface 22 also provides an avenue for operating the card with an external power source. Further, data can be transmitted through the interface for storage in the card's internal memory. This feature would permit the card to be used as a debit card in that an account balance could be periodically updated within the card and reduced during each transaction. In addition, the card could be reprogrammed, extending its potential life.

As pointed out above, the vast majority of existing electronic transaction terminals do not have a means for interfacing with the electrical contacts 22. Rather, the present transaction terminals 10 are provided with a sensor 12 to read information encoded on a magnetic stripe. A partial transaction terminal is illustrated at FIG. 2. It will be understood that existing transaction terminals typically include additional components, such as a microprocessor, key pad, and connection ports to a remote data base. For the subject invention, the relevant component is the sensor 12, which is typically a standard magnetic read head. The subject invention is intended to permit the use of smart cards with such presently available transaction terminals 10.

The above stated object of the invention is achieved by including within the smart card 20 a means for emulating a magnetic stripe. The means for emulating the magnetic stripe includes a transducer 26, which is provided within the carrier and disposed in a manner such that it can generate varying magnetic fields that extend beyond the carrier. The transducer 26 can be formed from an integrated thin film head or an electromagnetic coil that is compact and will operate at low power levels. While thin film heads have not been previously incorporated into transaction cards, the technology exists for providing such heads. Similar types of heads are manufactured by Censtor, Inc. for use with high density magnetic recording. Transducer 26 is positioned on card 20 in a manner such that alignment with the read sensor of existing terminals is facilitated.

It is also noted that transducers for generating information similar to data stored on tape are known in the art. For example, in U.S. Pat. No. 4,437,130 to Hennessy, a device is disclosed which receives multiple eight-track tape cartridges. The unit itself plugs into an eight-track tape player. Analog music signals on the eight-track tapes are transmitted to a transducer which supplies that information to the read head of the tape player. The latter patent to Hennessy demonstrates that it is feasible to have a fixed transducer head which can emulate the varying magnetic field pattern that would be sensed by a fixed read head when a moving magnetic medium is passed thereby.

Transducer 26 is connected along line 28 to microprocessor 24. A variety of microprocessors are available for performing the functions set forth within. One suitable microprocessor would be an 8048 type manufactured by Intel, Inc. The microprocessor would also be capable of performing multiple transaction functions as discussed above.

In accordance with the subject invention, a storage means is provided for holding processing instructions and data representative of various transaction information. In the illustrated embodiment, the processing instructions are stored in a masked program ROM 30. The masked program ROM is typically part of the microprocessor chip 24. Transaction data, including magnetic stripe information, may also be stored in the masked ROM 30. However, in the preferred embodiment discussed below, the latter information is stored in a separate EEPROM 60.

The magnetic stripe data stored in the card can include the account number of the user, the transaction identification number and other parameters. The specific information to be stored and the order in which the information is stored would be equivalent to that which is typically present on an encoded magnetic stripe. The format for an encoded magnetic stripe is standardized and can be found in ISO Standards 3554 and 4909.

In operation, the microprocessor will extract the information stored in the memory and generate a plurality of output signals which correspond to the transaction information. These output signals are supplied to the transducer 26 along line 28. Transducer 26 functions to generate a varying magnetic field which extends beyond the surface of the carrier and is readable by the sensor 12 in a transaction terminal 10. Once the transaction terminal reads the information transmitted by transducer 26, the approval process can begin. This approval process can take the form of an authorization within the terminal itself or through communication with a central data base having card holder information.

As can be appreciated, present day microprocessors are typically low power devices However, the proposed emulation function will require considerably more power. Therefore, it would be desirable to have a means for actuating the emulation function upon demand, to save battery power. Furthermore, in order to add another level of security, the actuation device would preferably be operable only by the authorized user.

In the illustrated embodiment, the actuation means includes a key pad 40. The key pad will typically include the standard keys of a calculator plus additional keys as discussed below. The key pad 40 is connected to the microprocessor 24 along line 42. As illustrated in FIG. 2, microprocessor 24 would also include a section of random access memory RAM 44 to provide temporary storage and facilitate interfacing between the inputs of the key pad. In practice, line 42 will be defined by a plurality of strobe lines for reading the elements of the key pad. As another desirable feature, the masked program ROM 30 is provided with a default program which allows the key pad to operate as a conventional calculator. In this situation, data from the calculations are shown on an LCD display 50, as shown in FIGS. 1 and 2. The LCD display 50 can also be used to flash financial information and various prompts to the cardholder during a transaction.

The keypad 40 supplies a means for actuating the emulation function. In the preferred embodiment, operation will be initiated only if the user enters a secret code or personal identification number (PIN) uniquely associated with that customer. Furthermore, the processor can be programmed such that if the wrong PIN is consecutively entered more than a few times, (presumably by an unauthorized user) the card will become disabled. Data representative of the user's secret code can be stored in memory.

In the preferred embodiment, an additional storage area, defined by an EEPROM 60 is provided. As is well-known, an EEPROM provides a relatively nonvolatile storage device, yet new data can be added when desired. New data can be entered through interface 22 as discussed above. By storing the secret code in an EEPROM, the issuer will be able to program the card allowing the customer to select his own secret code. Where an EEPROM 60 is provided in the card, it is also desirable to store transaction data therein, rather than in the fixed ROM. By this arrangement, the data can be updated without having to supply a new card to the user.

In operation of the preferred embodiment, the user will enter a multidigit number into the key pad 40. The microprocessor will compare the data entered by the user with the secret code information stored in memory. If the information matches, the user will be prompted, via the LCD display 50, to enter the transaction amount. If this amount is approved, then the emulation process will be initiated. As discussed above, the emulation process consists of retrieving transaction information from memory, generating output signals and supplying it to the transducer 26.

In some cases, after the terminal reads the transaction information, the data is transmitted to a central station for approval. An approval code (or denial) will be returned to the terminal. Some terminals may be provided with the capacity to authorize transactions, at the point of transaction, without communicating with a central station. Similarly, some smart cards may be designed such that certain, smaller transactions, are approved in the card itself. An approval code would then be generated, shown on the LCD display 50, and recorded by the merchant on the sales draft. Of course, in the latter case, the emulation function would not be activated.

The foregoing description of operation assumes that the card 20 is designed to emulate only a single magnetic stripe. However, in the preferred embodiment, information representative of the data contained on magnetic stripes of a number of cards may be stored in memory. Thus, the cardholder may use the subject transaction card 20 in place of a number of different cards.

Such multiple usage can be facilitated by providing additional keys 40A–C on the keypad 40. Each of these keys can be labelled to correspond with various cards the customer might carry. For ease of use, the keys might further be provided with the logos of various card distributors. In operation, the user would first select and press one of these specific keys, causing the microprocessor to access the corresponding data representative of the magnetic stripe information associated with the selected card. The user would then be prompted to enter the PIN associated with the selected card. The steps would continue, as discussed above, resulting in microprocessor generating and supplying the proper output signals to the transducer 26.

It is noted that the use of a single card to generate information about multiple cards is disclosed in U.S. Pat. No. 4,443,027, issued Apr. 17, 1984 to McNeely, cited above. In one of the embodiments disclosed in that patent, a microprocessor is utilized to store the information about various cards. However, the patent has no disclosure relating to a magnetic stripe emulator as disclosed herein.

As mentioned above, the subject microprocessor requires a source of energy for operation. As illustrated in FIG. 2, the source can be provided by a battery 70. Suitable long life batteries for the low power requirements of the microprocessor are available. However, if a reprogrammable memory 60 is provided, it is envisioned that the life of the card could be significantly longer than any fixed battery which can be obtained at reasonable cost. Accordingly, in an alternate embodiment of the subject invention, a solar panel 72, shown in phantom in FIG. 1, may be provided. Solar cells 72 are connected to a charger 74 also shown in phantom in FIG. 2. The solar cells would be provided to extend the life of the card beyond that of a conventional battery.

Whichever approach is taken to provide a power source for the card, it is desirable to minimize the time in which the transducer generates the varying magnetic field, since this function requires the most power. It is envisioned that when actuated, the transducer will generate a data stream in bursts lasting 30 to 100 milliseconds. These bursts will be repeated every second for approximately one minute. This sequence can be programmed to start after the transaction is approved by the microprocessor in the card.

Another approach would be to provide an additional button 80, (shown in phantom in FIG. 1) to activate the emulation function. This approach may be desirable in certain settings such as a restaurant, where the diner would enter his PIN and transaction amount at the table. The waiter would then have to go to another area in the establishment where the transaction terminal is located. The waiter could then take the final step of pressing the send button 80 to complete the transaction. Where a send button is used, the generation of the varying magnetic field can be limited to one burst per each depression of the key.

As mentioned above, a smart card can be used to store account balance information. This information can be updated through a terminal at the cardholder's bank. As the cardholder makes purchases with the card, the processor will keep track of a declining balance until funds are depleted.

The microprocessor can be programmed to provide other desirable features. For example, the card can be used to keep a running record of all transactions and provide the cardholder with a "bank statement" through the LCD display 50. In addition, the memory could be used to store telephone numbers or other information needed by the cardholder.

In summary, there has been provided a new and improved transaction card for use with present transaction terminals. The improved transaction card includes a microprocessor for performing additional functions. The subject card further includes a storage means for holding data representative of transaction information. In accordance with the subject invention, a transducer means is provided for generating a varying magnetic field beyond the surface of the card readable by the head in a transaction terminal. In operation, the microprocessor extracts transaction information from the storage means and generates output signals that are supplied to the transducer means. In this manner, the card of the subject invention can interface with present transaction terminals having a magnetic stripe reader.

While the subject invention has been described with reference to a preferred embodiment, it should be understood that various changes and modifications could be made therein, by one skilled in the art, without varying from the scope and spirit of the subject invention as defined by the appended claims.

What is claimed is:

1. A new transaction card having magnetic stripe emulator for use with a transaction terminal intended to interface with standard transaction cards, said standard transaction cards having a magnetic stripe formed thereon and with said terminal having a sensor means for reading transaction information encoded on the magnetic stripe on a standard card, said new card comprising:

a carrier configured to be receivable in the transaction terminal;

processor means within said carrier for generating electrical output signals;

storage means within said carrier and connected to said processor means, said storage means for holding data representative of transaction information; and transducer means within said carrier and connected to said processor means, said transducer means for generating a varying magnetic field, extending beyond the surface of the carrier, in response to electrical output signals from said processor means, said transducer means being positioned on said carrier to be in alignment with the sensor means of the terminal when said carrier is received in the terminal, with said processor means functioning to extract said data from said storage means and generate and supply output signals to the transducer means, and with the transducer means functioning to generate a varying magnetic field readable by the sensor means in the terminal, said varying magnetic field emulating the varying magnetic field which would exist at the sensor means of the terminal if the magnetic stripe of a standard card having transaction information encoded thereon was scanned by the sensor means.

2. a transaction card as recited in claim 1, further including a means for activating the emulation function.

3. a transaction card as recited in claim 2 wherein said activation means includes a key pad connected to said processor means.

4. A transaction card as recited in claim 3 wherein said storage means further includes data, representative of a secret code associated with the user and wherein said processor means functions to compare data entered into said keypad with the data held in said storage means and if identical said processor means will generate and suppy said output signals to said transducer means.

5. A transaction card as recited in claim 3 wherein said storage means includes a plurality of data sets representative of different accounts and wherein said individual data sets can be selected via said key pad causing said processor means to access said selected data set from the storage means and supply corresponding output signals to said transducer means.

6. A transaction card as recited in claim 5 wherein said key pad includes individual keys associated with each said data set.

7. A transaction card as recited in claim 1 further including a battery means within said carrier.

8. A transaction card as recited in claim 7 further including a solar cell means for charging the battery means.

9. A transaction card as recited in claim 1 wherein said transducer means comprises a thin film head.

10. A transaction card as recited in claim 1 wherein said transducer means is defined by an electromagnetic coil.

11. A transaction card as recited in claim 1 further including a plurality of electrical contacts connected to said processor means to define an electrical data interface.

* * * * *